United States Patent
Akella et al.

(10) Patent No.: US 11,548,512 B2
(45) Date of Patent: Jan. 10, 2023

(54) YIELD BEHAVIOR MODELING AND PREDICTION

(71) Applicant: Zoox, Inc., Foster City, CA (US)

(72) Inventors: Abishek Krishna Akella, Pleasanton, CA (US); Vasiliy Karasev, San Francisco, CA (US); Kai Zhenyu Wang, Foster City, CA (US); Rick Zhang, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 398 days.

(21) Appl. No.: 16/549,704

(22) Filed: Aug. 23, 2019

(65) Prior Publication Data

US 2021/0053570 A1 Feb. 25, 2021

(51) Int. Cl.
| | | |
|---|---|---|
| *B60W 30/18* | (2012.01) |
| *G06N 20/00* | (2019.01) |
| *B60W 50/00* | (2006.01) |
| *G05D 1/00* | (2006.01) |
| *G05D 1/02* | (2020.01) |

(52) U.S. Cl.
CPC ...... *B60W 30/18163* (2013.01); *B60W 50/00* (2013.01); *G05D 1/0088* (2013.01); *G05D 1/0221* (2013.01); *G06N 20/00* (2019.01); *B60W 2050/0028* (2013.01); *B60W 2520/10* (2013.01); *B60W 2554/00* (2020.02); *B60W 2554/804* (2020.02); *B60W 2710/20* (2013.01); *B60W 2720/106* (2013.01)

(58) Field of Classification Search
CPC ........... B60W 30/18163; B60W 50/00; B60W 2554/804; B60W 2554/00; B60W 2050/0028; B60W 2520/10; B60W 2710/20; B60W 2720/106; G06N 20/00; G05D 1/0088; G05D 1/0221; G06K 9/00825; G06K 9/00805
See application file for complete search history.

(56) References Cited

U.S. PATENT DOCUMENTS

| 10,434,935 | B1 * | 10/2019 | Zhang | G08G 1/005 |
| 2018/0059670 | A1 | 3/2018 | Nilsson | |
| 2018/0267557 | A1 * | 9/2018 | Yan | B60W 50/0098 |
| 2019/0071091 | A1 * | 3/2019 | Zhu | B60W 30/18163 |

(Continued)

OTHER PUBLICATIONS

The PCT Search Report and Written Opinion dated Nov. 26, 2020 for PCT application No. PCT/US20/47017, 17 pages.

(Continued)

*Primary Examiner* — Peter D Nolan
*Assistant Examiner* — Ashley L Redhead, Jr.
(74) *Attorney, Agent, or Firm* — Lee & Hayes, P.C.

(57) ABSTRACT

Techniques for determining a vehicle action and controlling a vehicle to perform the vehicle action for navigating the vehicle in an environment can include determining a vehicle action, such as a lane change action, for a vehicle to perform in an environment. The vehicle can detect, based at least in part on sensor data, an object associated with a target lane associated with the lane change action sensor data. In some instances, the vehicle may determine attribute data associated with the object and input the attribute data to a machine-learned model that can output a yield score. Based on such a yield score, the vehicle may determine whether it is safe to perform the lane change action.

20 Claims, 7 Drawing Sheets

(56) References Cited

U.S. PATENT DOCUMENTS

| | | | | |
|---|---|---|---|---|
| 2019/0212744 | A1* | 7/2019 | Milstein | B60W 60/0015 |
| 2019/0377351 | A1* | 12/2019 | Phillips | G05D 1/0214 |
| 2019/0384303 | A1* | 12/2019 | Muller | G06K 9/00791 |
| 2021/0001858 | A1* | 1/2021 | Kang | G08G 1/167 |

OTHER PUBLICATIONS

The International Preliminary Report on Patentability for PCT Application No. PCT/US20/47017, dated Mar. 3, 2022, 12 pg.

* cited by examiner

YIELD BEHAVIOR MODELING AND PREDICTION

BACKGROUND

An autonomous vehicle can use various methods, apparatuses, and systems to guide the autonomous vehicle through an environment. For example, an autonomous vehicle can use planning methods, apparatuses, and systems to determine a drive path and guide the autonomous vehicle through the environment that contains dynamic objects (e.g., vehicles, pedestrians, animals, and the like) and static objects (e.g., buildings, signage, stalled vehicles, and the like). In some instances, dynamic objects can affect an action of the autonomous vehicle as it traverses the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
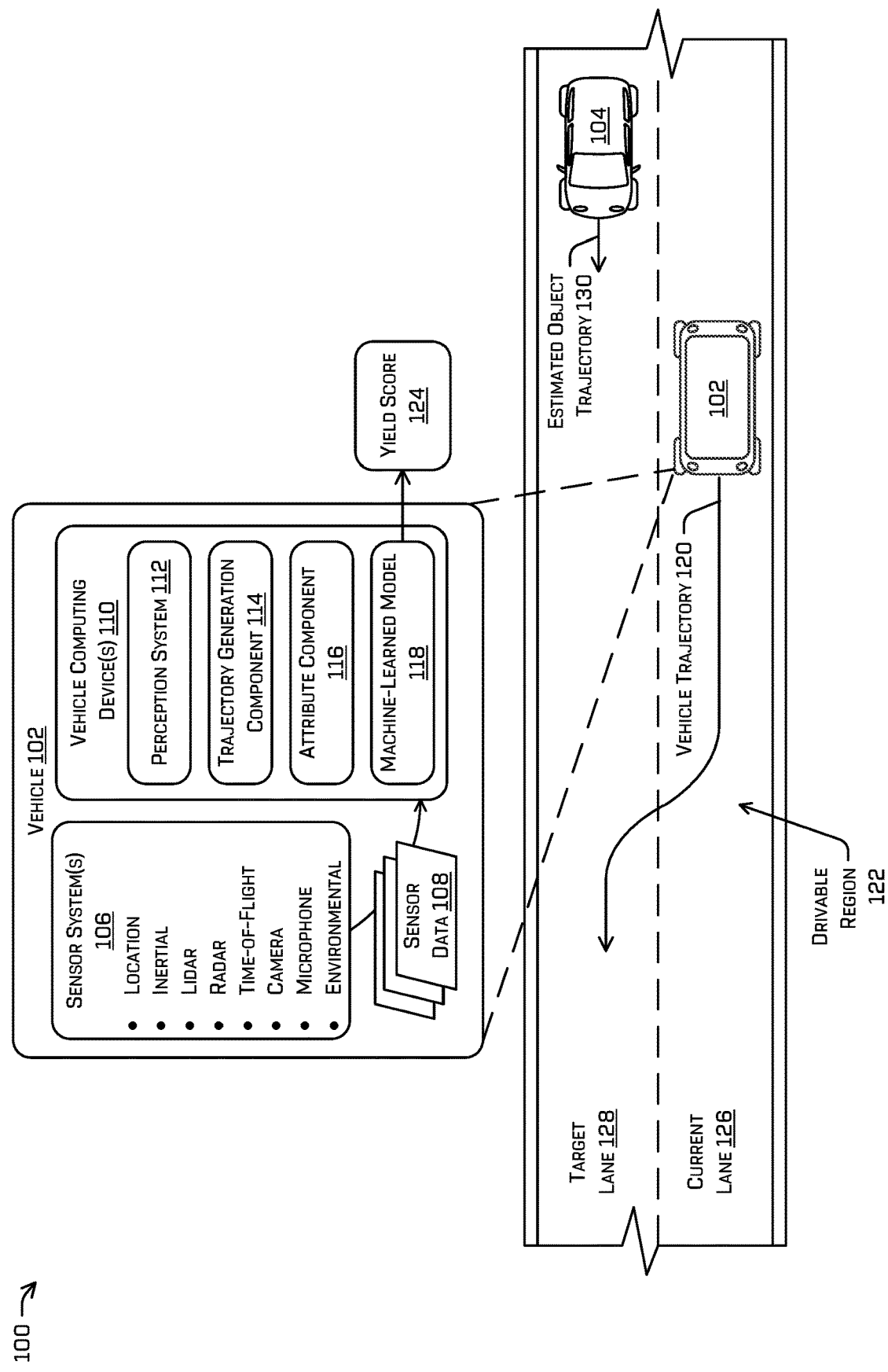
FIG. 1 depicts an example system for generating a trajectory, determining a yield score associated with an object in the environment, and performing a vehicle action, in accordance with examples of the disclosure.

Techniques for predicting actions of objects proximate to a vehicle are discussed herein. For example, as a vehicle traverses an environment, the vehicle can plan to change lanes from a current lane to a target lane as part of such traversal. Further, the vehicle can capture sensor data of objects proximate to the vehicle, which can indicate relative positions, velocities, accelerations, etc. of the vehicle and other objects in the environment. In some examples, such sensor data (or data based on the sensor data) can be input to a machine-learned model, which can provide an indication (e.g., a likelihood or a probability) of whether an object proximate to the vehicle (e.g., an object in the target lane for a lane change action) may be yielding to the vehicle or otherwise exhibiting behavior that can indicate that the vehicle can safely execute a lane change maneuver. When a vehicle determines that an object may be yielding (or when a likelihood or a probability of yielding meets or exceeds a threshold), the vehicle can safely execute a lane change action earlier than might otherwise be possible. Accordingly, the techniques discussed herein can provide predictions or indications of other vehicles or objects in an environment that may allow a vehicle (such as an autonomous vehicle) to safely traverse an environment.

In some instances, a computing device of an autonomous vehicle can receive sensor data, (e.g., time-of-flight data, lidar data, radar data, sonar data, and/or the like) to determine and/or control the vehicle to follow a trajectory, which can include a lane change action from a current lane into a target lane. Using the sensor data, the computing device can detect an object, which may be a dynamic object, represented in the sensor data of the environment. In some instances, the object can be another vehicle that is traversing along the target lane or a different portion of the drivable region, or any other object that is in movement in the environment around the vehicle.

In some instances, the computing device can determine attribute data that can be associated with the object, the autonomous vehicle, and/or the environment. The attribute data can include velocity data, acceleration data, and/or distance data (e.g., indicating a distance between the object and the autonomous vehicle) associated with the object and/or the autonomous vehicle. The velocity, acceleration, and distance data may be indicated relative to a vehicle frame of reference, an environment frame of reference, and/or any other suitable frame. Additionally, or alternatively, the attribute data can include an extent (e.g., length, width, height) of the object, vehicle status data (e.g., diagnostic information, a headlight and/or turn indicator status, a speaker status, and/or the like), and/or object status data (e.g., a headlight and/or turn indicator status, a gesture of an operator of the object, and/or the like). Additionally, or alternatively, the attribute data can include environment state data such as a state of a traffic light, a state of a railroad crossing, a state of a road condition, a state of the weather, and the like.

As discussed above, the computing device can input, into a machine-learned model, the sensor data and/or the attribute data, and receive from the machine-learned model an indication (e.g., a likelihood or a probability) that the object in the target lane will yield to (or perform a yield action for) the autonomous vehicle. By way of example and without limitation, the autonomous vehicle, while traversing the environment, can activate a turn indicator on a right side of the autonomous vehicle and/or "nudge" toward a target lane where the target lane is toward the right side of the autonomous vehicle. In some examples, nudging into the target lane can comprise a change of a lateral position of the autonomous vehicle within the current lane toward the target lane. In some examples, the probability (e.g., a likelihood or posterior probability of a hypothesis that an object is yielding in view of observed data (e.g., sensor data) is true) that the object will yield can be represented as a yield score that is associated with the object. By way of example and without limitation, the yield score can be a numerical value between 0 and 1 where a yield score that is close to 0 can indicate a low probability of the object yielding to the autonomous vehicle and where a yield score that is close to 1 can indicate a high probability of the object yielding to the autonomous vehicle. In at least some examples, such a probability may be used to determine the yield score (e.g., wherein the yield score is a function of such a probability or likelihood).

In any of the examples above, the yield score may be combined (e.g., summed) with other scores in order to determine an action for the vehicle to take. As a non-limiting example, though a yield score may be high (e.g., indicative of the additional vehicle yielding), other factors contributing to a total score (e.g., safety, presence of other objects, rules of the road (e.g., not to change lanes in an intersection), etc.) may preclude the vehicle from performing the lane change action. In such examples, the yield score may be effectively weighted with respect to any other scores for determining the total score.

In some instances, the computing device can capture and/or determine additional attribute data to determine the probability that the object will yield. For example, during and/or after a period of time has elapsed after activating the turn indicator, the autonomous vehicle can capture and/or determine additional attribute data. By way of example and without limitation, the autonomous vehicle can determine first attribute data before, second attribute data substantially contemporaneously with, and/or third attribute data after activating the turn indicator on the right side of the autonomous vehicle. In some examples, the computing device may compile attribute data over a time window (e.g., 500 milliseconds, 1 second, 3 seconds, 5 seconds, etc.) as an attribute data log.

Training the machine-learned model can be based, at least in part, on log data. For example, a vehicle or multiple vehicles can traverse an environment and generate log data associated with the operation of the vehicle(s). The log data can include sensor data captured by one or more sensors of the vehicle, perception data indicating objects identified by one or more systems onboard the vehicle (or produced during a post-processing phase), prediction data indicating an estimated future position, velocity, and/or acceleration of an object (whether produced during the recording or subsequent thereto), and/or status data indicating diagnostic information, trajectory information, headlight and/or turn indicator activation, and/or other information generated by the vehicle. Examples of data generated by a vehicle that can be included in the log data can be found, for example, in U.S. patent application Ser. No. 16/392,094 titled "Scenario Editor and Simulator" and filed Apr. 23, 2019 which is incorporated by reference in its entirety.

In some instances, the log data can include vehicle action data such as lane change data. The lane change data can indicate lane change actions and/or attempted lane change actions and can also include when the vehicle successfully completed a lane change action and when the vehicle could not complete a lane change action. Additionally, the log data can indicate attribute data (e.g., velocity, pose, relative distances, and/or the like) associated with the vehicle and/or objects. At least part of the log data can be used as ground truth data (also referred to as ground truth attribute data) for training the machine-learning model.

In some instances, the log data can additionally or alternatively include simulated log data. For example, the log data can be synthetic log data (or simulated sensor data) generated without the use of a vehicle capturing sensor data of an environment. The synthetic log data can be used to generate a simulated scenario and a simulator can execute the simulated scenario to simulate an autonomous vehicle controller (or a simulated vehicle) operating within the simulated scenario. By executing the simulated scenario, the simulator can generate simulation data that can also be used to train the machine-learning model.

After the machine-learning model is trained, the machine-learned model can output the yield score. In some instances, the computing device can use a yield score threshold to determine if the yield score meets or exceeds the yield score threshold. If the yield score meets or exceeds the yield score threshold, the computing device can control the vehicle to perform the lane change action. If the yield score does not meet or exceed the yield score threshold, the computing device can refrain from performing the lane change action (or may perform additional actions such as additional signaling, nudging, etc.). Examples of generating trajectories that include lane change actions can be found, for example, in U.S. patent application Ser. No. 16/179,711 titled "Cost Scaling in Trajectory Generation" and filed Nov. 2, 2018, which is hereby incorporated by reference in its entirety.

As discussed above, in the case where the vehicle is an autonomous vehicle, a computing device can control the vehicle to follow a trajectory which can be based on the yield score. As discussed above, the yield score can indicate a probability of an object yielding to the vehicle or not yielding to the vehicle. By predicting that an object will not yield, the vehicle can determine a target trajectory that avoids a predicted trajectory associated with the object, which can reduce a likelihood of a collision. Additionally, by predicting that an object will yield, the vehicle can determine a target trajectory that includes a safe distance between the vehicle and the object. Thus, using the yield score, the trajectory can be a safer and/or a more comfortable trajectory than a target trajectory that does not use the yield score by accounting for an object yielding for the vehicle.

The techniques discussed herein can improve functionality of a computing device by newly equipping the computing device to determine potential outcomes of an object yielding or not yielding, in order to determine a safe and efficient trajectory for controlling a vehicle. Determining an appropriate trajectory for a vehicle according to the techniques disclosed herein in yielding scenarios such as those described herein can improve the safety and efficiency of operation of a vehicle. The trajectories determined according to the techniques discussed herein may more nearly approximate or perform better than human reactions to object behavior, and may therefore decrease a probability of a negative safety outcome and increase the efficiency with which the vehicle navigates the environment.

Additionally, the techniques described herein can reduce an amount of required computational resources. For example, a computing device associated with a vehicle can determine one or more trajectories including a lane change action while traversing an environment. The computing device can use a machine-learned model that has been trained based on similar trajectories in similar simulated environments to output yield scores associated with an object in the environment and can have reference costs associated with the trajectories. The techniques discussed herein can equip the computing device to determine an appropriate trajectory in difficult yielding determination scenarios based at least in part on the yield score and reduce an amount of computational resources (e.g., processing power, network utilization, etc.) required to determine the appropriate trajectory in such a scenario.

The techniques described herein can be implemented in a number of ways. Example implementations are provided below with reference to the following figures. Although discussed in the context of an autonomous vehicle, the techniques described herein can be applied to a variety of systems requiring determination and detection of objects, and is not limited to autonomous vehicles. In one example, similar techniques may be utilized in driver-controlled vehicles in which such a system may provide an indication of whether it is safe to perform various maneuvers. In another example, the systems, methods, and apparatuses can be used in an aeronautical and/or nautical context. Additionally, the techniques described herein can be used with captured data (e.g., captured using sensor(s)), simulated data (e.g., generated by a simulator), or any combination of the two.

FIG. 1 depicts an example system for generating a trajectory, determining a yield score associated with an object in the environment, and performing a vehicle action. More specifically, FIG. 1 illustrates an example environment 100 in which a vehicle 102 is driving in the environment 100, although in other examples the vehicle 102 can be stationary and/or parked in the environment 100. One or more objects, or agents, are also in the environment 100. For instance, FIG. 1 illustrates an additional vehicle 104 (also referred to as an object) in the environment 100. Of course, any number and/or type of objects can additionally or alternatively be present in the environment 100. For example, objects such as pedestrians, bicycles/bicyclists, motorcycles/motorcyclists, buses, streetcars, trucks, animals, and/or the like can be present in the environment 100.

For the purpose of illustration, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In the example of FIG. 1, the vehicle 102 can be associated with sensor system(s) 106. The sensor system(s) 106 can generate sensor data 108, which can be used by vehicle computing device(s) 110 associated with the vehicle 102 to recognize the one or more objects, e.g., the object 104. The sensor system(s) 106 can include, but is/are not limited to, light detection and ranging (LIDAR) sensors, radio detection and ranging (RADAR) sensors, time-of-flight sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, infrared (IR), intensity, depth, etc.), wheel encoders, microphones, environment sensors (e.g., temperature sensors, humidity sensors, light sensors, pressure sensors, etc.), etc.

In at least one example, the vehicle computing device(s) 110 can include a perception system 112, which can perform object detection, segmentation, and/or classification based at least in part on the sensor data 108 received from the sensor system(s) 106. For instance, the perception system 112 can detect the object 104 in the environment 100 based on the sensor data 108 generated by the sensor system(s) 106. Additionally, the perception system 112 can determine an extent (e.g., height, weight, length, etc.), a pose (e.g., x-coordinate, y-coordinate, z-coordinate, pitch, roll, yaw), etc. of the object 104. The sensor system(s) 106 can continuously generate the sensor data 108 (e.g., in near-real time), which can be used by the perception system (and other systems of the vehicle computing device(s) 110).

The vehicle computing device(s) 110 can also include a trajectory generation component 114, an attribute component 116, and a machine-learned model 118. The trajectory generation component 114 can include functionality to generate a vehicle trajectory 120, which can be a reference trajectory or a target trajectory within the drivable region 122, in accordance with the embodiments discussed herein. The attribute component 116 can include functionality to determine, based at least in part on the sensor data 108, attribute data associated with an object such as the object 104. The attribute data can include attributes such as an object extent, an object classification, an object pose, an object trajectory, and/or an object velocity, indicator (e.g., headlight, other signal) status of the object 104, a gesture of an operator of the object 104, and/or the like. The machine-learned model 118 can include functionality to receive, as input, the attribute data and output a yield score 124. As discussed above, the yield score 124 can be a numerical value that can indicate a probability of the object yielding to the vehicle.

As depicted in FIG. 1, the vehicle trajectory 120 can, for example, include a lane change action from a current lane 126 into a target lane 128. In some instances, the lane change action can be based on an upcoming action. By way of example and without limitation, the vehicle 102 can follow a vehicle trajectory 120 that includes a right turn at an upcoming intersection. To prepare for the right turn, the vehicle 102 can perform a lane change action into the target lane 128. In some instances, the lane change action can be based on traffic conditions and/or obstacles in the drivable region 122 where the lane change action can allow the vehicle 102 to more efficiently and/or more safely traverse through traffic and/or the environment 100.

As discussed above, the vehicle 102 can be stationary and/or parked in the environment 100. By way of example and without limitation, the vehicle 102 can be parked where the current lane 126 is a parking lane and the vehicle trajectory 120 allows the vehicle 102 to enter the target lane 128 which can be a traffic lane.

In some instances, the target lane 128 can be an adjacent lane to the current lane 126, as depicted in FIG. 1. In some instances, the target lane 128 can be a lane that is separated by a portion of the drivable region 122. By way of example and without limitation, a bicycle lane can separate the current lane 126 from the target lane 128 where performing the lane change action will cause the vehicle 102 to traverse through the bicycle lane in order to enter the target lane 128. In some instances, a bus lane can separate the current lane 126 from the target lane 128, although other types of lanes and/or drivable areas are contemplated. Any intermediate lanes, such as a bicycle lane, bus lane, and/or the like may be determined by the vehicle 102 and the techniques discussed herein may be additionally or alternatively applied to the intermediate lane. For example, the vehicle computing device(s) 110 may determine a first yield score associated with the target lane 128 and a second yield score associated with an intermediate lane. The vehicle computing device(s) 110 may determine whether to execute a lane change action based at least in part on the first yield score and/or the second yield score.

The vehicle 102 can capture the sensor data 108 and determine that the object 104 is represented in the sensor data 108 and is traversing the environment 100 in the target lane 128. Based on the sensor data 108, the attribute component 116 can determine attribute data associated with the object 104 and/or the vehicle 102. As discussed above, the attribute data can include velocity data, acceleration data, and/or distance data associated with the object 104 and/or the vehicle 102, and/or any other parameter associated with the object 104 (e.g., lighting states, size, relative velocity, and the like).

The attribute data can be provided to the machine-learned model 118 as input which can determine output a yield score 124. In at least some examples, a number of such attributes over a period of time may be input into such a model (e.g., over the period of 1 s, 2 s, 8 s, etc., though any number of observations is contemplated). As discussed above, the yield score 124 can be a numerical value between 0 and 1 where the yield score 124 that is close to 0 can indicate a low probability or a low likelihood that the object 104 will yield to the vehicle 102 and where the yield score 124 that is close to 1 can indicate a high probability or a high likelihood that the object 104 will yield to the vehicle 102.

In some instances, the machine-learned model 118 can determine, based on the yield score 124, an estimated object trajectory 130, which may comprise and/or be associated with a motion profile (also referred to as a predicted motion profile). A motion profile can provide a predicted motion of the object and indicate how the object 104 will change a velocity of the object 104 and/or whether or not the object 104 will yield to the vehicle 102. The machine-learned model 118 can determine the estimated object trajectory 130 (and/or the motion profile) by, for example, considering the yield score 124, the velocity of the object 104, the acceleration of the object 104, a pose associated with the wheels of the object 104, a turn indicator status of the object 104, and/or the like.

By way of example and without limitation, the attribute data can indicate that the vehicle 102 is traveling at a velocity of 15 meters per second and that the object 104 is traveling behind the vehicle 102 at a velocity of 16 meters per second in the target lane 128. Additionally, the attribute data can indicate that a distance between the vehicle 102 and the object 104 is 40 meters. After a period of time has elapsed (e.g., 2 seconds), the computing device can collect additional attribute data that indicates that the vehicle 102 is traveling at a velocity of 16 meters per second, that the object 104 is traveling at a velocity of 13 meters per second, and that the distance between the autonomous vehicle and the dynamic object is 42 meters. The computing device can provide the attribute data and the additional attribute data as input into the machine-learned model 118 which can determine, based on the attribute data and the additional attribute data, the estimated object trajectory 130.

Based on the object 104 decreasing its velocity from 16 meters per second to 13 meters per second, an increase in the distance between the vehicle 102 and the object 104, and comparisons between candidate object trajectories, the machine-learned model 118 can determine a yield score 124 of 0.95. Based on the yield score 124, the vehicle computing device(s) 110 can determine that it is safe to perform the lane change action and determine a vehicle trajectory 120 for controlling the vehicle 102 to transition into the target lane 128.

The vehicle trajectory 120 can be a target trajectory and can be generated with respect to a reference trajectory by evaluating one or more costs. The reference trajectory can represent an initial path or trajectory for the vehicle 102 to follow and can be generated or received by the vehicle computing device(s) 110. In some examples, the reference trajectory can correspond to a centerline of a road segment (e.g., the current lane 126), although the reference trajectory can represent any path in the environment 100. A target trajectory, based on the yield score 124, can include the lane change action and/or refrain the vehicle 102 from performing the lane change action and can be generated with respect to the reference trajectory by evaluating one or more costs associated with points on the reference trajectory. In general, the one or more costs can include, but are not limited to a reference cost, an obstacle cost, a lateral cost, a longitudinal cost, and/or the like. For example, the costs can be based at least in part on boundaries of the drivable region 122 and the vehicle 102 can alter the target trajectory based on the costs.

The target trajectory can be determined in association with a discrete segment of control (e.g., over a receding horizon) intended to be carried out by the vehicle to traverse through the environment 100 within the drivable region 122. Examples of techniques for determining trajectories within drivable regions can be found, for example, in U.S. patent application Ser. No. 15/982,694 titled "Drive Envelope Determination" and filed May 17, 2018, which is hereby incorporated by reference in its entirety. In some instances, the vehicle 102 can follow the target trajectory which can include the vehicle action such as the lane change action into the target lane 128, as discussed above.

Regarding the costs described above, a reference cost can comprise a cost associated with a difference between a point (also referred to as a reference point) on the reference trajectory and a corresponding point (also referred to as a point or a target point) on the target trajectory, whereby the difference represents one or more difference in a yaw, lateral offset, velocity, acceleration, curvature, curvature rate, and/or the like. In some examples, decreasing a weight associated with a reference cost can reduce a penalty associated with the target trajectory being located a distance away from the reference trajectory, which can provide smoother transitions leading towards safer and/or more comfortable vehicle operations.

In some examples, an obstacle cost can comprise a cost associated with a distance between a point on the reference trajectory or the target trajectory and a point associated with an obstacle in the environment. By way of example, the point associated with the obstacle can correspond to a point on a boundary of a drivable area or can correspond to a point associated with the obstacle in the environment. In some examples, an obstacle in the environment can include, but is not limited to a static object (e.g., building, curb, sidewalk, lane marking, sign post, traffic light, tree, etc.) or a dynamic object (e.g., a vehicle, bicyclist, pedestrian, animal, etc.). In some examples, a dynamic object can also be referred to as an agent. In some examples, a static object or a dynamic object can be referred to generally as an object or an obstacle.

In some examples, a lateral cost can refer to a cost associated with steering inputs to the vehicle, such as maximum steering inputs relative to a velocity of the vehicle. In some examples, a longitudinal cost can refer to a cost associated with a velocity and/or acceleration of the vehicle (e.g., maximum braking and/or acceleration). Such costs can be used to ensure that the vehicle is operating within feasible limits and/or comfort limits for passengers being ferried. In some examples, a planning system can determine a first cost for a trajectory associated with the drivable region 122 in the current lane 126, which can be higher than a second cost associated with a lane change action. Thus, an action can be selected or determined based on costs associated with each action. Examples of determining costs associated with actions can be found, for example, in U.S. patent application Ser. No. 15/843,512 titled "Trajectory Generation Using Curvature Segments" and filed Dec. 14, 2018, which is hereby incorporated by reference, in its entirety.

In some examples, a first cost associated with a first target lane can be lower than a second cost associated with a second target lane. By way of example and without limitation, the vehicle 102 can be traversing the environment in a center lane with an obstruction associated with the center lane. The vehicle 102 can determine a first yield score associated with a first object in a first target lane and a second yield score associated with a second object in a second target lane. The first yield score can be higher than the second yield score and subsequently, decreasing the obstacle cost associated with the first lane when compared to the obstacle cost associated with the second lane. Therefore, based at least in part on the yield score, a first cost associated with the first target lane can be lower than the second cost associated with the second target lane.

In some instances, the estimated object trajectory 130 can further be used to determine the obstacle cost associated with a target lane 128. For example, the yield score 124 can be a low yield score and the estimated object trajectory 130 can indicate that the object 104 will increase its velocity. The increase in the velocity of the object 104 can increase a likelihood of a collision with the vehicle 102 and increase the obstacle cost associated with the target lane 128. In such scenarios, the vehicle 102 can abort the lane change action to avoid the possible collision of the object 104 into the vehicle 102.

In some instances, the vehicle computing device(s) 110 can use a yield score threshold to determine that it is safe to perform the lane change action. By way of example and without limitation, the yield score threshold can be 0.9 and the yield score 124 can be 0.95, in which case the vehicle computing device(s) 110 may determine to execute the vehicle trajectory 120 causing the vehicle 102 to transition into the target lane 128. If the yield score does not meet or exceed the yield score threshold, the vehicle computing device(s) 110 can cause the vehicle 102 to maintain a former trajectory and/or generate a new candidate trajectory associated with the current lane 126 and/or the target lane 128. In some examples, the vehicle computing device(s) 110 may generate a new candidate trajectory associated with the target lane 128 and re-perform the yield score determination after a time and/or distance has past (e.g., after 3 seconds, after 5 seconds, after 10 meters) and/or after detecting that the object 104 has passed the vehicle 102.

FIG. 1 illustrates a single example of using a yield score to determine a trajectory in an environment. Other examples also are contemplated. For example, the attribute component 116 can determine attribute data for multiple objects in the environment.

Figure 2:
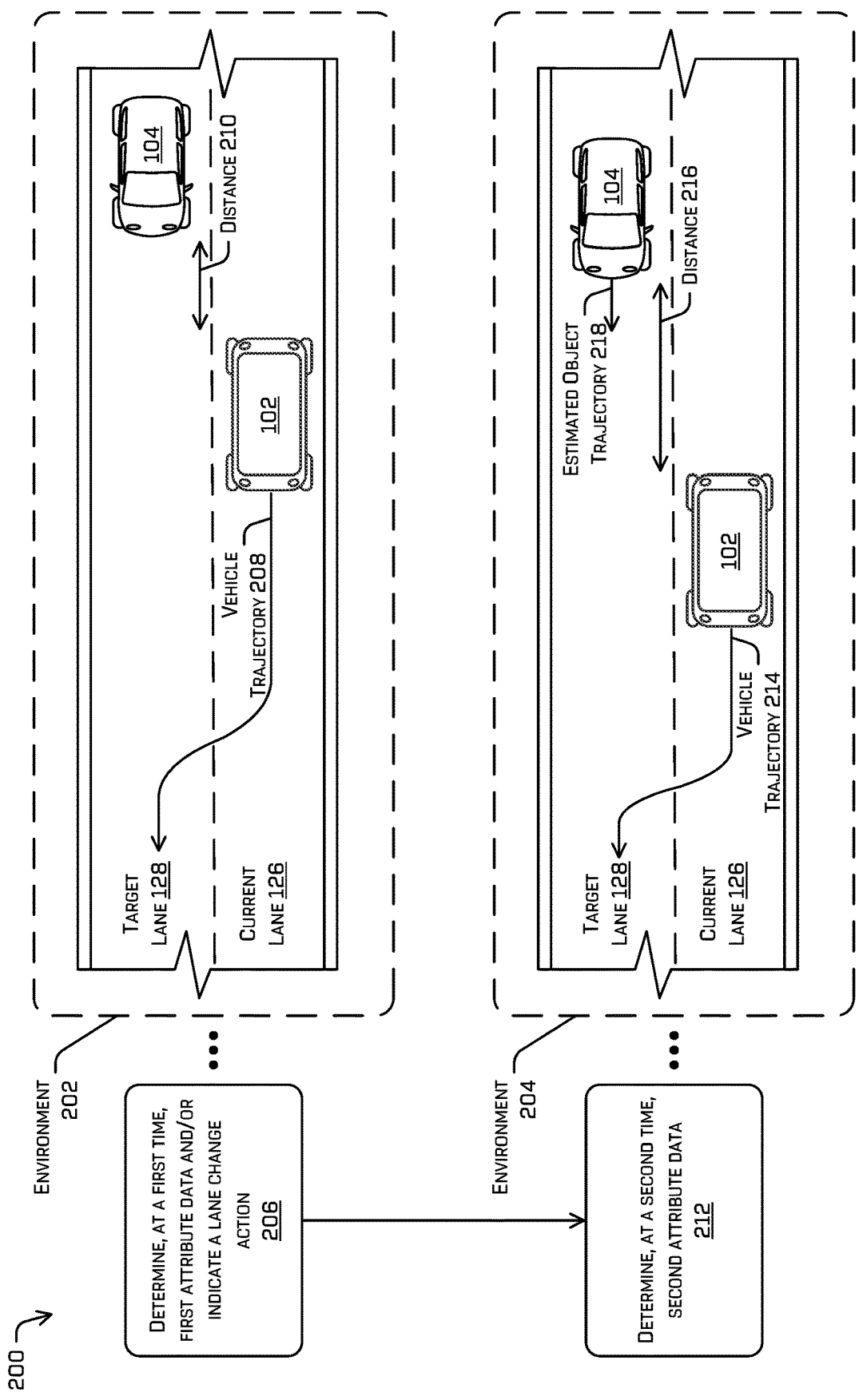
FIG. 2 depicts a pictorial flow diagram for determining first attribute data and/or indicating a lane change at a first time and determining second attribute data at a second time, in accordance with examples of the disclosure.

FIG. 2 depicts a pictorial flow diagram of an example process 200 of an environment 202 and an environment 204 through which a vehicle 102 follows a vehicle trajectory 208 that includes a lane change action. FIG. 2 further illustrates an object 104 in the environment 202 and the environment 204.

At operation 206 of example process 200, the vehicle 102 can follow a vehicle trajectory 208 while traversing in a current lane 126. In some instances, the vehicle trajectory 208 can correspond to the vehicle trajectory 120 of FIG. 1, although the vehicle trajectory 208 can represent any path or trajectory in the environment 202. Additionally, the vehicle 102 can determine, at a first time, first attribute data and/or indicate a lane change action. The first attribute data can include velocity data associated with the vehicle 102 and/or the object 104, acceleration data associated with the vehicle 102 and/or the object 104, and/or distance data indicating a distance 210 between the object 104 and the vehicle 102. In some instances, the vehicle 102 can indicate a lane change action. By way of example and without limitation, the vehicle 102 can activate a turn indicator on a right side of the vehicle 102 and/or "nudge" toward the target lane 128 where the target lane is toward the right side of the vehicle 102. As described above, in some examples, nudging into the target lane 128 can comprise a change of a lateral position of the vehicle 102 within the current lane 126 toward the target lane 128.

At operation 212 of example process 200, the vehicle 102 can follow the vehicle trajectory 214 while traversing in the current lane 126. Additionally, the vehicle 102 can determine, at a second time, second attribute data. The second attribute data, associated with the second time (e.g., during and/or after the vehicle 102 activates a turn indicator, some other signal emitter, and/or attribute data associated with the object 104 changes), can include velocity data associated with the vehicle 102 and/or the object 104, acceleration data associated with the vehicle 102 and/or the object 104, and/or distance data indicating a distance 216 between the object and the autonomous vehicle. In some instances, the object 104 can react to the vehicle 102 indicating the lane change action. By way of example and without limitation, the object 104 can observe the vehicle 102 activating the turn indicator and/or "nudging" toward the target lane 128. Subsequently, the object 104 can maintain or change a velocity of the object 104.

For example, the attribute data that indicates that the object 104 is slowing down or maintaining a velocity can be input into the machine-learned model to generate a yield score which can indicate that the object 104 is yielding. In some instances, attribute data that indicates that the object 104 is increasing a velocity of the object 104 can be input into the machine-learned model to generate a yield score that indicates that the object 104 is not yielding.

In some instances, the second attribute data can be determined after determining the first attribute data without the vehicle providing an indication of a lane change action. Thus, the determination of first attribute data and second attribute data can be performed on a continuous and/or periodic basis. Furthermore, the attribute data can be input into the machine-learned model which can generate yield scores associated with the object 104 on a continuous and/or periodic basis. By way of example and without limitation, the vehicle 102 can determine attribute data associated with the vehicle 102 and/or the object 104 on periodic basis such as every 0.5 seconds and determine a set of attribute data associated with the vehicle 102 and/or the object 104. Then, the vehicle 102 can input the set of attribute data to the machine-learned model to determine the yield score associated with the object 104.

As described above, the yield score can be used to determine an estimated object trajectory 218 which, in some instances, can correspond to the estimated object trajectory 130 of FIG. 1, although the estimated object trajectory 218 can represent any path or trajectory in the environment 202. By way of example and without limitation, the estimated object trajectory 218 can indicate how the object 104 will change, or not change, a velocity of the object 104 to yield to the vehicle 102 or to not yield to the vehicle 102.

Figure 3:
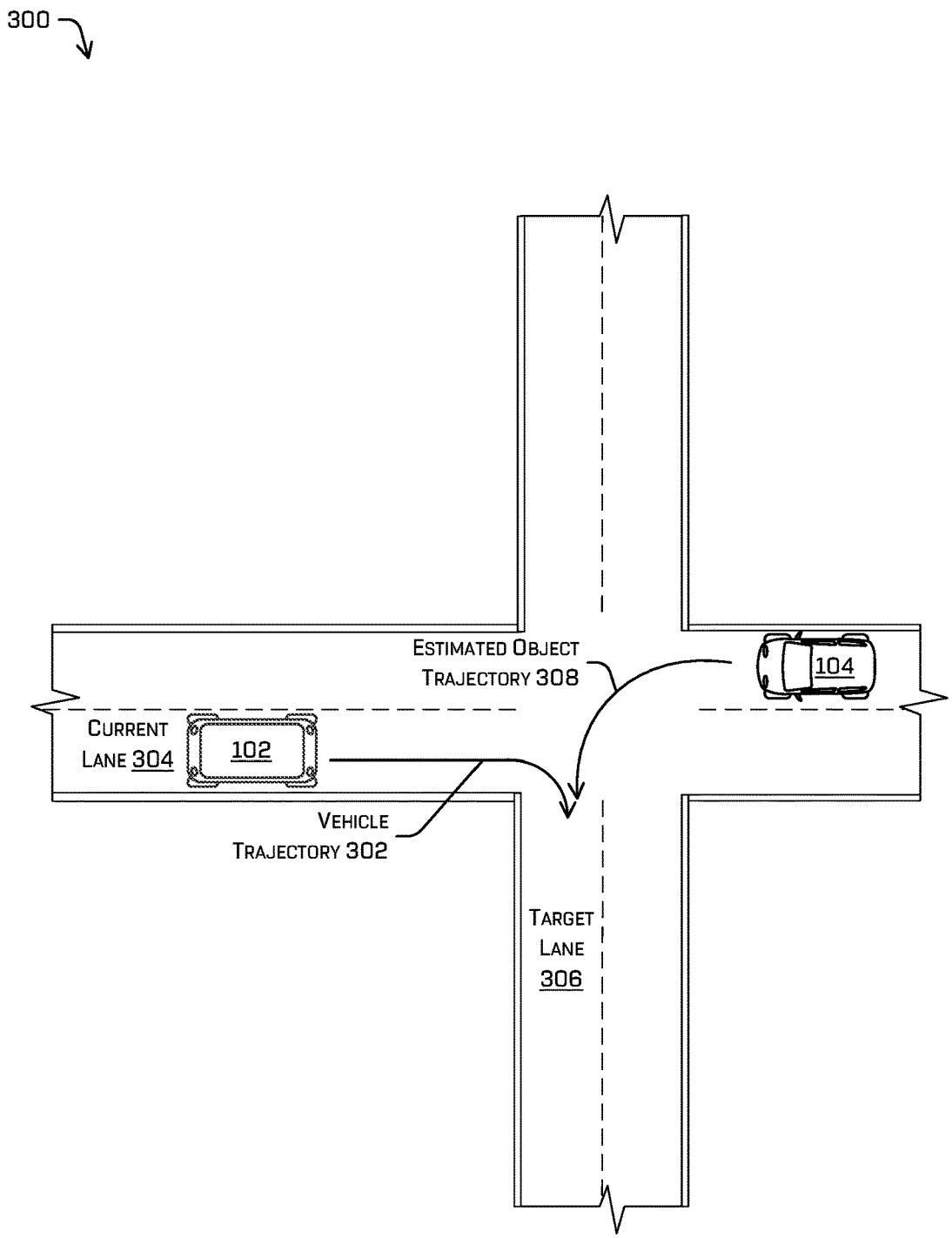
FIG. 3 depicts an example environment of a vehicle determining a yield score associated with an object at an intersection, in accordance with examples of this disclosure.

FIG. 3 depicts an example environment 300 of a vehicle 102 determining a yield score associated with an object 104 at an intersection.

As discussed above, the vehicle 102 can determine a vehicle trajectory 302 that includes a right turn from a current lane 304 to a target lane 306. In some instances, the vehicle 102 can enable a turn indicator during an approach of the vehicle 102 toward the intersection.

As the vehicle 102 traverses the environment 300, the vehicle 102 can capture sensor data of a portion of the environment 300. Using the sensor data, a computing device of the vehicle 102 can detect an object 104, which can be a dynamic object, represented in the sensor data of the environment 300. As depicted in FIG. 3, the object 104 can be another vehicle that is approaching the intersection from an oncoming direction. In some instances, the object 104 can be stationary at the intersection. In some instances, the object 104 can be approaching the intersection from a different direction (e.g., a left side, relative to the vehicle 102, of the intersection). The intersection can be an uncontrolled intersection. For example, the intersection can be an intersection that is not controlled by traffic lights and/or traffic signage (e.g., a stop sign, a yield sign, etc.).

As discussed above, the vehicle 102 can determine attribute data associated with the object and/or the vehicle 102 as the vehicle 102 approaches the intersection. In some instances, the intersection can be a controlled intersection where at least one portion of the intersection is associated with a traffic light and/or traffic signage. In some instances, the attribute data can include sensor data that can indicate whether the intersection is controlled or uncontrolled, a traffic light status, etc. The machine-learned model can be trained to determine whether the object 104 will conform to the traffic light and/or the traffic signage to determine the yield score. By way of example and without limitation, the vehicle 102 can determine, based at least in part on sensor data, a vehicle trajectory 302 for controlling the vehicle 102 as the vehicle 102 approaches the uncontrolled intersection. In the depicted example, the vehicle trajectory 302 includes a right turn from the current lane 304 to the target lane 306 at the uncontrolled intersection. The attribute data can indicate that the object 104 is stationary at the intersection with a left turn indicator enabled. Based on the attribute data, the vehicle 102 can determine the estimated object trajectory 308 that indicates that the object 104 intends to take a left turn into the target lane 306.

The computing device of the vehicle 102 can provide the attribute data as input into the machine-learned model which can output a yield score associated with the object 104. Based on the yield score meeting or exceeding a yield score threshold and/or a motion profile determined by the machine-learned model, the vehicle 102 can determine that the object 104 will likely yield to the vehicle 102 and execute the vehicle trajectory 302.

By way of example and without limitation, the attribute data can indicate that the object 104 is approaching the uncontrolled intersection and that the object 104 reduced a velocity of the object 104 after the vehicle enables a right turn indicator. In some instances, the attribute data can indicate a time of arrival (e.g., with respect to a region or location associated with the intersection), a distance to the intersection, and the like. The attribute data can be input into the machine-learned model to output a yield score which can indicate that the object 104 will likely yield to the vehicle 102. In some instances, the yield score can indicate that the object 104 will not likely yield to the vehicle 102 despite the reduction in velocity. The machine-learned model can be trained to distinguish an object reducing a velocity in preparation for a turn as distinct from an object reducing the velocity in preparation to yield. As discussed above, the machine-learned model can be trained based on captured log data and/or synthetic log data to serve as ground truth data for these scenarios.

Figure 4:
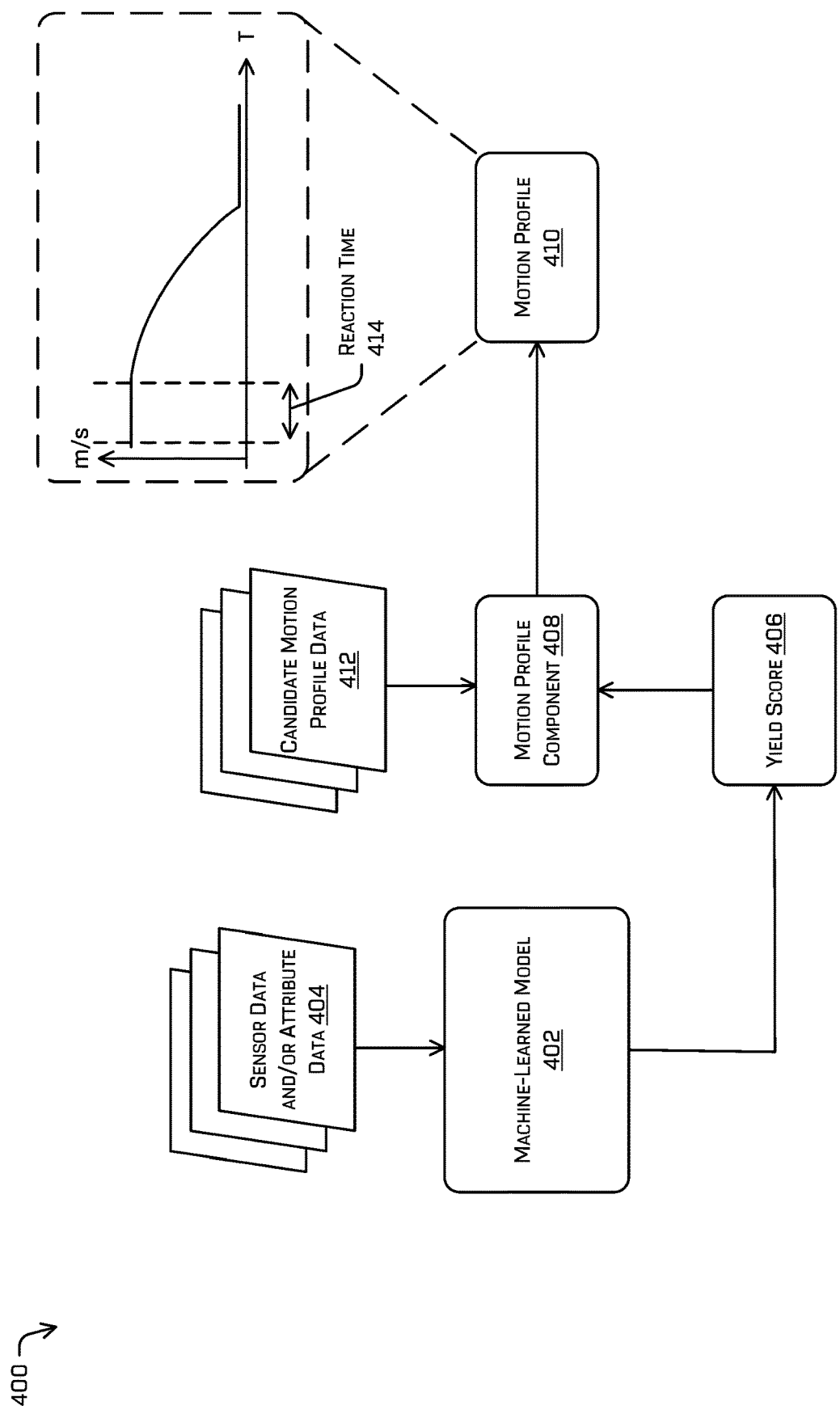
FIG. 4 depicts a block diagram of techniques for determining a yield score and/or a motion profile data, in accordance with examples of the disclosure.

FIG. 4 depicts a block diagram 400 of techniques for determining a motion profile based at least in part on the yield score. As discussed above, a machine-learned model 402 can receive, as input, sensor data and/or attribute data 404 to determine a yield score 406 associated with an object in the environment. In some instances, the machine-learned model 402 can correspond to the machine-learned model 118 of FIG. 1. After receiving the sensor data and/or attribute data 404, the machine-learned model 402 can determine a yield score 406 associated with the object in the environment.

As discussed above, the yield score 406 can be an indication (e.g., a likelihood or a probability) that the object in the target lane will yield to the vehicle. By way of example and without limitation, the yield score 406 can be a numerical value between 0 and 1 where a yield score that is close to 0 can indicate a low probability of the object yielding to the autonomous vehicle and where a yield score that is close to 1 can indicate a high probability of the object yielding to the autonomous vehicle. In some examples, such a score may differ (such as the inverse of the above) based on the particular formulation used.

Using the yield score 406, a motion profile component 408 can determine a motion profile 410 that can indicate how the object will likely behave over a period of time. In some instances, the motion profile component 408 can receive candidate motion profile data 412 which can include a set of candidate motion profiles associated with other objects represented in log data. As discussed above, log data can include sensor data captured by one or more sensors of a vehicle, perception data indicating objects identified by one or more systems onboard the vehicle (or produced during a post-processing phase), prediction data indicating an estimated future position, velocity, and/or acceleration of an object (whether produced during the recording or subsequent thereto), and/or status data indicating diagnostic information, trajectory information, headlight and/or turn indicator activation, and/or other information generated by the vehicle. The motion profiles from the log data can be stored in a database as candidate motion profile data 412. Additionally, the candidate motion profile data 412 can indicate how objects behaved before, during, and/or after a lane change action was attempted by the vehicle and whether the lane change action was successful.

In some instances, the motion profile component 408 can include a motion profile machine-learned model to generate the motion profile 410. For example, a motion profile machine-learned model can be trained, based on yield scores generated by the machine-learned model 402 and ground truth data that indicates a motion of an object, to determine a motion profile of objects based on a yield score. Then the motion profile component 408 can receive the yield score 406 and generate the motion profile 410.

Therefore, the machine-learned model 402 can use the sensor data and/or attribute data 404 and/or the attribute data to determine a yield score 406 and then the motion profile component 408 can use the yield score 406 to compare with candidate yield scores associated with the set of candidate motion profiles of the candidate motion profile data 412. Based on the comparison, the motion profile component 408 can determine the motion profile 410 which can be based on a candidate motion profile and indicate how the object will likely behave over a period of time. In some instances, the motion profile component 408 can use the sensor data and/or attribute data 404 in addition to the yield score 406 and compare the sensor data and/or attribute data 404 and the yield score 406 with the data stored in the candidate motion profile data 412 to determine the motion profile 410.

As depicted in FIG. 4, the motion profile 410 can be represented as a graph with velocity along an x-axis and time along a y-axis. By way of example and without limitation, motion profile 410 can indicate that the object associated with the motion profile 410 maintained a velocity and decreased its velocity after a period of time (e.g., reaction time 414). The reaction time 414 can indicate an amount of time between when the vehicle begins a lane change action and when the object changes its velocity in response to the vehicle beginning the lane change action. In some instances, the motion profile component 408 can determine a motion profile 410 that includes the reaction time 414. In some instances, the motion profile component 408 can determine a motion profile 410 that omits the reaction time 414 if it determines that the object has already begun yielding to the vehicle. As discussed above, the motion profile 410 can be used to determine an obstacle cost associated with the lane change action and/or the target lane.

Figure 5:
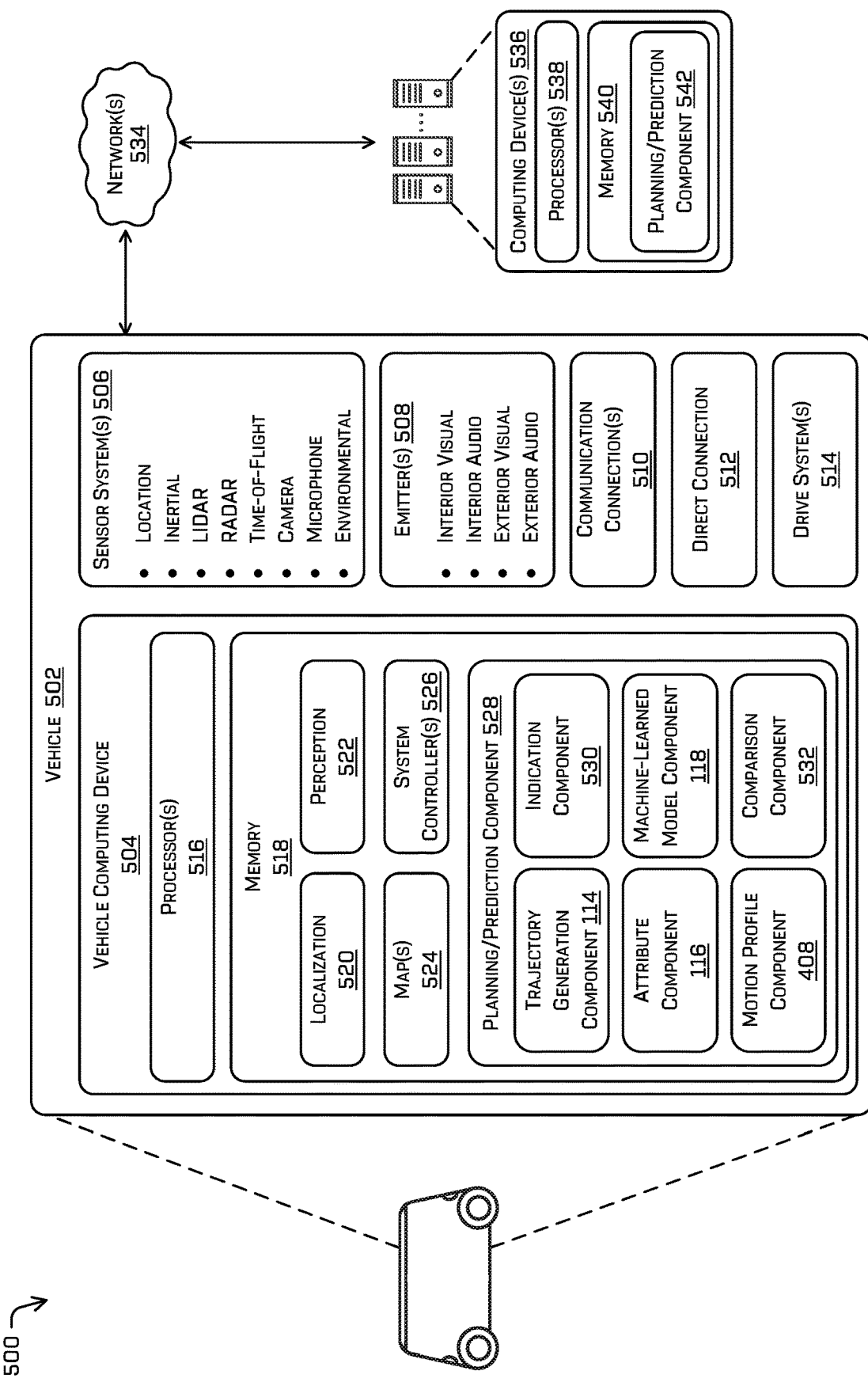
FIG. 5 depicts a block diagram of an example system for implementing the techniques described herein.

FIG. 5 depicts a block diagram of an example system 500 for implementing the techniques described herein. In at least one example, the system 500 can include a vehicle 502.

The vehicle 502 can include a vehicle computing device 504, sensor system(s) 506, emitter(s) 508, communication connection(s) 510, at least one direct connection 512, and drive system(s) 514.

The vehicle computing device 504 can include processor(s) 516 and memory 518 communicatively coupled with the processor(s) 516. In the illustrated example, the vehicle 502 is an autonomous vehicle; however, the vehicle 502 can be any other type of vehicle. In the illustrated example, the memory 518 of the vehicle computing device 504 stores a localization component 520, a perception component 522, map(s) 524, system controller(s) 526, and a planning/prediction component 528 comprising the trajectory generation component 114, the indication component 530, the attribute component 116, a machine-learned model 118, a motion profile component 408, and a comparison component 532. Though depicted in FIG. 5 as residing in memory 518 for illustrative purposes, it is contemplated that the localization component 520, the perception component 522, the map(s) 524, the system controller(s) 526, the planning/prediction component 528, the trajectory generation component 114, the indication component 530, the attribute component 116, the machine-learned model 118, the motion profile component 408, and the comparison component 532 may additionally, or alternatively, be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, unknown, etc.). In additional or alternative examples, the perception component 522 can provide processed sensor data that indicates one or more characteristics (also referred to as attributes) associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 518 can further include map(s) 524 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the map(s) 524 can include at least one map (e.g., images and/or a mesh). In some examples, the vehicle 502 can be controlled based at least in part on the map(s) 524. That is, the map(s) 524 can be used in connection with the trajectory generation component 114, the localization component 520, the perception component 522, and/or the planning/prediction component 528 to determine a location of the vehicle 502, identify objects in an environment, and/or generate routes and/or trajectories to navigate within an environment.

In some examples, the map(s) 524 can be stored on a remote computing device(s) (such as the computing device(s) 536) accessible via network(s) 534. In some examples, multiple maps 524 can be stored based on, for example, a characteristic (e.g., type of entity, time of day, day of week, season of the year, etc.). Storing multiple maps 524 can have similar memory requirements, but increase the speed at which data in a map can be accessed.

In at least one example, the vehicle computing device 504 can include system controller(s) 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

In general, the planning/prediction component 528 can determine a path for the vehicle 502 to follow to traverse through an environment. For example, the planning/prediction component 528 can determine various routes and trajectories and various levels of detail. For example, the planning/prediction component 528 can determine a route to travel from a first location (e.g., a current location) to a second location (e.g., a target location). For the purpose of this discussion, a portion of a route can include a lane change action from a current lane to a target lane. Further, the planning/prediction component 528 can generate an instruction for guiding the autonomous vehicle along at least a portion of the route from the current lane to the target lane. In some examples, the instruction can be a trajectory, or a portion of a trajectory. In some examples, multiple trajectories (e.g., multiple lane change actions associated with multiple target lanes) can be substantially simultaneously generated (e.g., within technical tolerances) in accordance with a receding horizon technique, wherein one of the multiple trajectories is selected for the vehicle 502 to navigate.

In some instances, the planning/prediction component 528 can include functionality to generate predicted trajectories (also referred to as motion profiles) of objects in an environment. For example, the planning/prediction component 528 can generate one or more predicted trajectories for vehicles, pedestrians, animals, and the like within a threshold distance from the vehicle 502. In some instances, the planning/prediction component 528 can measure a track of an object and generate a trajectory for the object based on observed and predicted behavior. Examples of generating predicted trajectories are discussed in U.S. patent application Ser. No. 16/151,607, filed Oct. 4, 2018 and Ser. No. 15/982,658, filed May 17, 2018. application Ser. Nos. 16/151,607 and 15/982,658 are herein incorporated by reference, in their entirety.

In some instances, the trajectory generation component 114 can include functionality to generate a reference trajectory and/or a target trajectory within a drivable area. For example, the trajectory generation component 114 can receive sensor data from the sensor system(s) 506 and/or can receive information about obstacles and/or objects in the environment from the perception component 522. Based at least in part on the sensor data and/or on information associated with the objects (e.g., location, pose, extent, classification, velocity, predicted trajectories, etc.) the trajectory generation component 114 can determine a drivable area. In some instances, the trajectory generation component 114 can determine an extent of the region(s) based on a classification type associated with objects proximate to the region(s) and/or based on a velocity of the vehicle 502.

To generate a trajectory, the trajectory generation component 114 can receive or determine a reference trajectory, which can correspond to a centerline of a road segment or other path through an environment. In some instances, the trajectory generation component 114 can generate segments that can correspond to a motion primitive generated in accordance with the techniques discussed in U.S. patent application Ser. No. 15/843,596, filed Dec. 15, 2017. application Ser. No. 15/843,596 is herein incorporated by reference, in its entirety. As discussed above, the trajectory generated by the trajectory generation component 114 can include a lane change action from a current lane into a target lane.

In some instances, the trajectory generation component 114 can include functionality to evaluate one or more costs to generate a target trajectory with respect to the reference trajectory. As discussed above, the one or more costs may include, but is not limited to, a reference cost, an obstacle cost, a lateral cost, and longitudinal cost, and the like. In some examples, one or more costs can be evaluated in accordance with the techniques discussed in U.S. patent application Ser. No. 16/147,492, filed Sep. 28, 2018, which is hereby incorporated by reference, in its entirety.

In some instances, the indication component 530 can include functionality to perform a lane change indication. For example, the indication component 530 can determine that a lane change action is associated with a trajectory generated by the trajectory generation component 114. Then the indication component 530 can perform a lane change indication that can include, for example, activating a turn indicator (e.g., one of the emitter(s) 508, which may include a speaker and/or light, for example) and/or "nudging" toward a target lane.

In some instances, the attribute component 116 can include functionality to determine attribute data based, at least in part on, sensor data generated by the sensor system(s) 506. The attribute data can include velocity data associated with the object, velocity data associated with the autonomous vehicle, acceleration data associated with the object, acceleration data associated with the autonomous vehicle, and/or distance data indicating a distance between the object and the autonomous vehicle, although other types of data are contemplated such as an extent (e.g., length, width, height) of the object, vehicle status data (e.g., diagnostic information, a headlight and/or turn indicator status, a speaker status, and/or the like), and/or object status data (e.g., a headlight and/or turn indicator status, a gesture of an operator of the object, and/or the like).

In some instances, the machine-learned model 118 can include functionality to receive, as input, the sensor data and/or the attribute data and output a yield score associated with an object in the environment. The machine-learned model 118 can be implemented as a neural network. In some instances, the machine-learned model 118 can determine, based on the attribute data, a motion profile which can indicate, for example, how an object will behave over a period of time. The machine-learned model 118 can determine the motion profile by, for example, considering the yield score associated with the object, velocity of the object, the acceleration of the object, a pose associated with the wheels of the object, a turn indicator status of the object, and the like.

The motion profile component 408, as described above, can store and/or access a database of motion profiles. As the machine-learned model 118 determines the yield score associated with the object, the motion profile component 408 can use the sensor data/attribute data and the yield score to compare with motion profiles of the motion profile data. Based on the comparison, the motion profile component 408 can determine a motion profile associated with an object in the environment which can indicate how the object will likely behave over a period of time.

A comparison component 532 can include functionality to compare the yield score output by the machine-learned model 118 with a yield score threshold. A yield score that meets or exceeds the yield score threshold can indicate that the object associated with the yield score is more likely than not to yield and a yield score that does not meet or exceed the yield score threshold can indicate that the object is more likely than not to not yield. By comparing the yield score to the yield score threshold, the vehicle computing device 504 can determine that the yield score meets or exceeds the yield score threshold and determine that it is safe to perform the lane change action.

In some instances, the yield score can be a median of a range of yield scores. By way of example and without limitation, the yield score can be a numerical value between 0 to 1 and the yield score threshold can be a 0.5. In some instances, the yield score threshold can be determined by the machine-learned model 118. For example, the machine-learned model 118 can be trained, based on training data that can include training attribute data, sensor data, and/or ground truth data, to determine the yield score threshold such that yield scores generated based on the input sensor data and/or attribute data will meet or exceed the yield score threshold or fall below the yield score threshold if the sensor data and/or the attribute data indicates that the object will yield or not yield, respectively.

The machine-learned model 118 discussed herein may comprise a neural network, which is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters. For example, the neural network may include one or more neural networks such as ResNet50, ResNet101, ResNet 152, VGG, DenseNet, PointNet, and the like.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

In at least one example, the sensor system(s) 506 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 506 can include multiple instances of each of these or other types of sensors. For instance, the lidar sensors can include individual lidar sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device 504. Additionally, or alternatively, the sensor system(s) 506 can send sensor data, via the one or more networks 534, to the one or more computing device(s) 536 at a particular frequency, after a lapse of a predetermined period of time, in near real-time, etc.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 534. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include processor(s) and memory communicatively coupled with the one or more processors. The memory can store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In some examples, the vehicle 502 can send sensor data to one or more computing device(s) 536 via the network(s) 534. In some examples, the vehicle 502 can send raw sensor data to the computing device(s) 536. In other examples, the vehicle 502 can send processed sensor data and/or representations of sensor data to the computing device(s) 536. In some examples, the vehicle 502 can send sensor data to the computing device(s) 536 at a particular frequency, after a lapse of a predetermined period of time, in near real-time, etc. In some cases, the vehicle 502 can send sensor data (raw or processed) to the computing device(s) 536 as one or more log files.

The computing device(s) 536 can include processor(s) 538 and a memory 540 storing a planning/prediction component 542.

In some instances, the planning/prediction component 542 can substantially correspond to the planning/prediction component 528 and can include functionality to generate trajectories for the vehicle 502 in an environment. In some examples, memory 540 may additionally or alternatively store any of the trajectory generation component 114, the attribute component 116, the machine-learned model 118, the motion profile component 408, the indication component 530, and/or the comparison component 532. For example, the computing device(s) 536 may determine, by the motion profile component 408, motion profile(s) based at least in part on log data received from one or more vehicles and may transmit the motion profile(s) to one or more vehicles for storage in association with motion profile component 408.

The processor(s) 516 of the vehicle 502 and the processor(s) 538 of the computing device(s) 536 can be any suitable processor capable of executing instructions to process data and perform operations as described herein. By way of example and not limitation, the processor(s) 516 and 538 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 540 are examples of non-transitory computer-readable media. The memory 518 and 540 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 518 and 540 can include at least a working memory and a storage memory. For example, the working memory may be a high-speed memory of limited capacity (e.g., cache memory) that is used for storing data to be operated on by the processor(s) 516 and 538. In some instances, the memory 518 and 540 can include a storage memory that may be a lower-speed memory of relatively large capacity that is used for long-term storage of data. In some cases, the processor(s) 516 and 538 cannot operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 502 can be associated with the computing device(s) 536 and/or components of the computing device(s) 536 can be associated with the vehicle 502. That is, the vehicle 502 can perform one or more of the functions associated with the computing device(s) 536, and vice versa.

Figure 6:
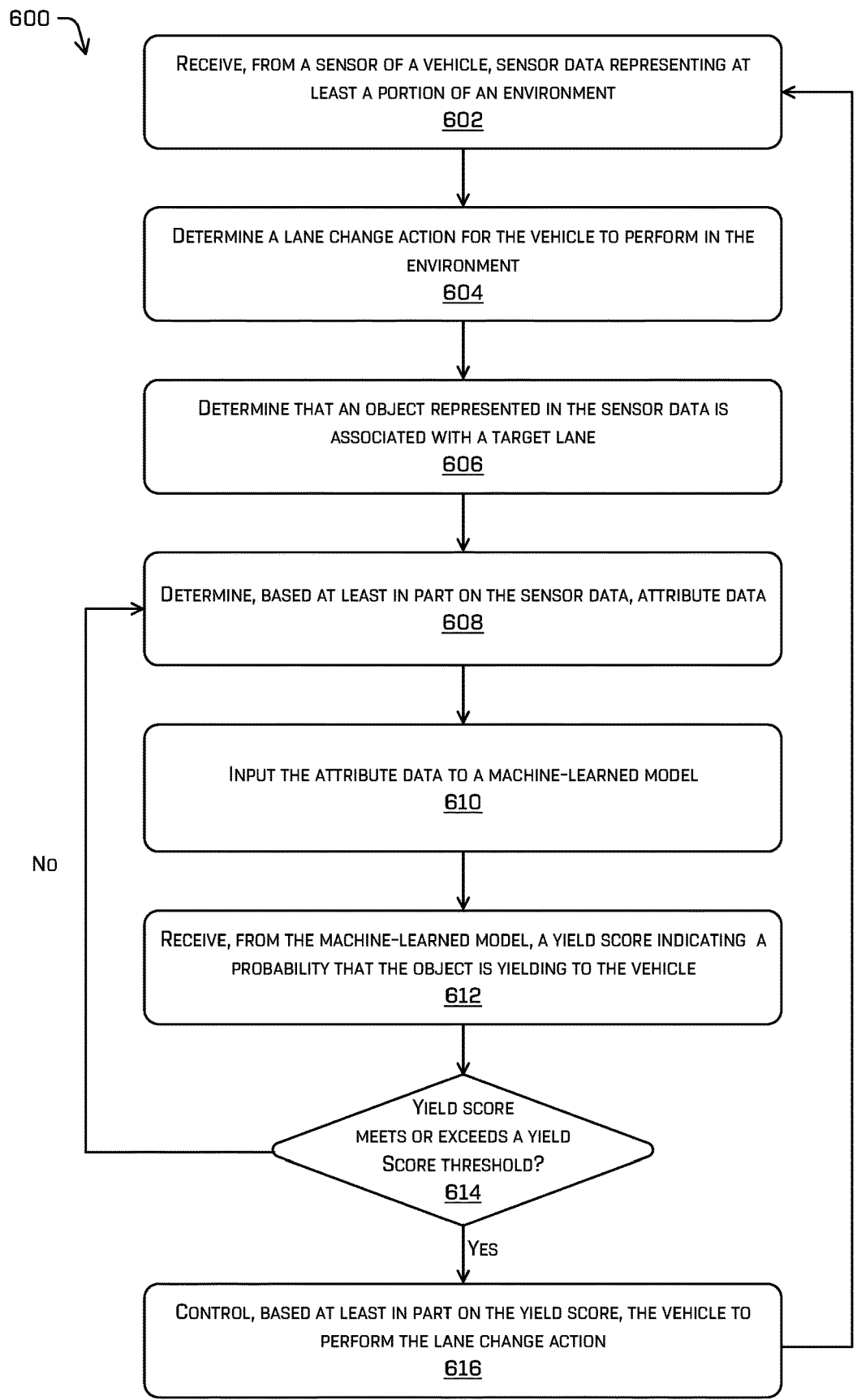
FIG. 6 depicts a flow diagram of an example process for determining a yield score and controlling a vehicle based at least in part on the yield score, in accordance with examples of the disclosure.

FIGS. 5 and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 depicts an example process 600 for determining a yield score and controlling, based at least in part on the yield score, the vehicle to perform a lane change action, in accordance with embodiments of the disclosure. For example, some or all of the process 600 can be performed by one or more components in FIG. 1 or 5, as described herein. For example, some or all of the process 600 can be performed by the vehicle computing device(s) 110, the vehicle computing device 504, and/or computing device(s) 536.

At operation 602 of example process 600, the process 600 can include receiving, from a sensor of a vehicle, sensor data representing at least a portion of an environment. In some instances, the vehicle can be stationary and/or parked in the environment. In some instances, the vehicle can be traversing the environment while receiving, from the sensor, the sensor data.

At operation 604 of example process 600, the process 600 can include determining a lane change action for the vehicle to perform in the environment. In some instances, determining the lane change action can be based at least in part on a trajectory that includes the lane change action. For example, a computing device of the vehicle can determine the lane change action as a part of the trajectory based at least in part on traffic conditions and/or obstacles in the environment where the lane change action can allow the vehicle to more efficiently and/or more safely traverse through traffic and/or the environment. In some instances, the lane change action can be based at least in part on an upcoming action. By way of example and without limitation, the vehicle can follow a trajectory that includes a right turn at an upcoming intersection. To prepare for the right turn, the vehicle can perform a lane change action into the target lane. In some examples, the lane change action can comprise an unprotected turn and/or a turn at a protected intersection. The lane change action can be associated with a target lane and/or an intermediate lane (e.g., a bike lane, a bus lane). Although the discussion herein primarily regards a target lane, it is understood that the techniques discussed herein may be additionally or alternatively applied to an intermediate lane.

At operation 606 of example process 600, the process 600 can include determining than an object represented in the sensor data is associated with a target lane. As discussed above, the vehicle can perform object detection, segmentation, and/or classification based at least in part on the sensor data received from the sensor to determine that the sensor data represents an object and that the object is associated with the target lane.

At operation 608 of example process 600, the process 600 can include determining, based at least in part on the sensor data, attribute data. In some instances, the attribute data can include attributes such as an object extent, an object classification, an object pose, an object trajectory, object acceleration, object status, object distance from the vehicle, and/or an object velocity, although other attributes are contemplated such as a light status of the object, a gesture of an operator of the object, and the like. The attribute data can additionally, or alternatively, comprise similar data corresponding to the vehicle and/or the attribute data may be indicated with reference to attribute data associated with the vehicle (e.g., the object velocity can be indicated with reference to a position and/or velocity of the vehicle). In at least some examples, such attribute data may comprise attributes determined over a period of time preceding and up to and/or including a present time (e.g., 1 s, 2 s, 4 s, 8 s, etc.).

At operation 610 of example process 600, the process 600 can include providing the attribute data as input to a machine-learned model that is trained to output a yield score.

At operation 612 of example process 600, the process 600 can include receiving, from the machine-learned model, a yield score indicating a probability that the object is yielding to the vehicle. The yield score can be a numerical value that can indicate a probability of the object yielding to the vehicle. The machine-learned model can be trained based on similar trajectories represented in similar simulated environments from log data.

At operation 614 of example process 600, the process 600 can include determining whether the yield score meets or exceeds a yield score threshold. If the yield score does not meet or exceed the yield score threshold, then the process 600 can return to operation 608. If the yield score does meet or exceed the yield score threshold, then the process 600 can proceed to operation 616. In some instances, the yield score can be associated with a cost. For example, a lower yield score can be associated with a lower probability that the object will yield and, in turn, can be associated with a higher cost of performing a lane change action. Likewise, a higher yield score can be associated with a higher probability that the object will yield and, in turn, can be associated with a lower cost of performing the lane change action. In some instances, operation 614 can include determining whether the cost meets or exceeds a cost threshold.

At operation 616 of example process 600, the process 600 can include controlling, based at least in part on the yield score, the vehicle to perform the lane change action. For example, the vehicle may determine to cancel a lane change action based at least in part on determining that the yield score does not meet or exceed a yield score threshold or the vehicle may cause the lane change action to be completed based at least in part on determining that the yield score meets or exceeds the yield score threshold. In some instances, a yield score that falls below the yield score threshold can cause an obstacle cost associated with the lane change action, the target lane, and/or a target trajectory to increase. In response to the cost increase, the vehicle can determine to cancel the lane change action.

Figure 7:
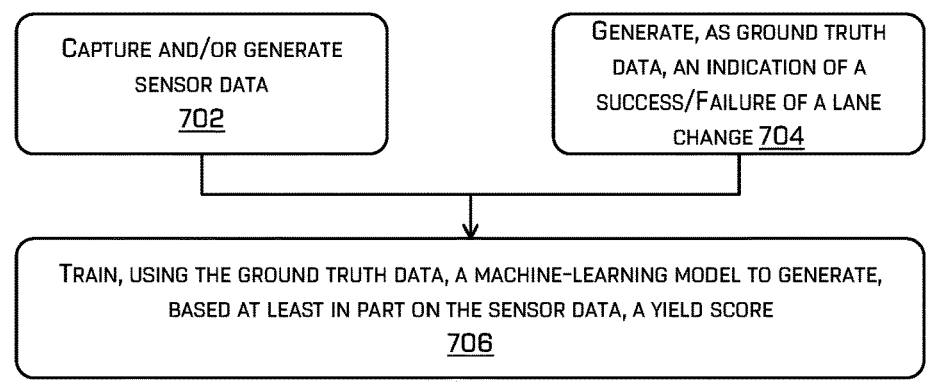
FIG. 7 depicts a flow diagram of an example process for training a machine-learning model to determine a yield score based at least in part on captured/generated sensor data and ground truth data, in accordance with examples of the disclosure.

FIG. 7 depicts an example process 700 for training a machine-learning model to generate a yield score.

At operation 702 of example process 700, the process 700 can capture and/or generate sensor data and determine attribute data therefrom, wherein the attribute data can be associated with an object in a database stored in a memory of the vehicle. In some instances, the sensor data can be captured by one or more vehicles while traversing an environment. In some instances, the sensor data can be synthetic sensor data that is generated in a simulation environment.

At operation 704 of example process 700, the process 700 can include generating an indication of a success or a failure of a lane change as ground truth data. The ground truth data can indicate whether the vehicles attempted, succeeded, and/or failed in performing a lane change operation based on the sensor data, attribute data, and/or motion profile(s). In some examples, the ground truth data can indicate the motion profile used (and/or the motion profile associated with a highest yield score) in association with an attempted lane change and/or the attribute data associated therewith.

At operation 706 of example process 700, the sensor data can be input into the machine-learning model to generate a yield score. The machine-learning model can be trained to generate the yield score based at least in part on the sensor data and the ground truth data. For example, the sensor data can be input to a machine-learning model where a known result (e.g., the ground truth data indicating a known lane change success, a lane change failure, a correct motion profile) can be used to adjust weights and/or parameters of the machine-learning model to minimize an error. In some instances, the ground truth data can be labeled sensor data and/or attribute data. In some instances, the ground truth data can be synthetic sensor data. As discussed above, the machine-learning model can use loss functions (e.g., L1, L2, softmax, etc.) to minimize the error. Such a model may be one or more of a linear or logistic regression, or otherwise.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality and are intended to be within the scope of this disclosure. Furthermore, although specific distributions of responsibilities are defined above for purposes of discussion, the various functions and responsibilities might be distributed and divided in different ways, depending on circumstances. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: A system comprising: one or more processors; and one or more computer-readable media storing computer-executable instructions that, when executed, cause the system to perform operations comprising: receiving, from a sensor of an autonomous vehicle, sensor data representing at least a portion of an environment; determining a lane change action for the autonomous vehicle to perform in the environment; determining that an object represented in the sensor data is associated with a target lane associated with the lane change action; determining, based at least in part on the sensor data, attribute data comprising: first velocity data associated with the autonomous vehicle, second velocity data associated with the object, and a distance between the autonomous vehicle and the object; inputting the attribute data into a machine-learned model; receiving, from the machine-learned model, a yield score indicating a probability that the object is yielding to the autonomous vehicle; and controlling, based at least in part on the yield score, the autonomous vehicle to perform the lane change action.

B: The system of paragraph A, wherein the attribute data is first attribute data associated with a first time and the distance is a first distance, the operations further comprising: determining second attribute data associated with a second time, the second attribute data comprising: third velocity data associated with the autonomous vehicle, fourth velocity data associated with the object, and a second distance between the autonomous vehicle and the object at the second time; and inputting the second attribute data into the machine-learned model.

C: The system of paragraph B, wherein the second attribute data is further based at least in part on a lane change indication.

D: The system of paragraph A, the operations further comprising: determining, based at least in part on the yield score, a cost associated with the lane change action; wherein controlling the autonomous vehicle is further based at least in part on the cost.

E: The system of paragraph A, wherein the object is associated with at least one of: an additional vehicle; a bicyclist; a motorcycle; or a truck.

F: A method comprising: receiving, from a sensor of a vehicle, sensor data of an environment; determining, based at least in part on the sensor data, a presence of an object in the environment; determining, based at least in part on the sensor data, attribute data comprising: first velocity data associated with the vehicle; second velocity data associated with the object; and a distance between the vehicle and the object; inputting the attribute data into a machine-learned model; and receiving, from the machine-learned model, a yield score indicative of a probability of a yield action associated with the object; and controlling, based at least in part on the yield score, the vehicle.

G: The method of paragraph F, wherein: the attribute data is first attribute data associated with a first time and the distance is a first distance, the method further comprising: determining second attribute data associated with a second time, the second attribute data comprising: third velocity data associated with the vehicle; fourth velocity data associated with the object; and a second distance between the vehicle and the object; and inputting the second attribute data into the machine-learned model.

H: The method of paragraph G, further comprising: controlling the vehicle to perform a lane change indication; wherein determining the attribute data is further based at least in part on the lane change indication.

I: The method of paragraph H, further comprising: determining that the yield score meets or exceeds a yield score threshold; wherein controlling the vehicle is further based at least in part on the yield score meeting or exceeding the yield score threshold.

J: The method of paragraph F, further comprising: determining, based at least in part on the yield score, a predicted motion profile indicative of a predicted motion of the object; wherein controlling the vehicle is further based at least in part on the predicted motion profile.

K: The method of paragraph J, further comprising: determining, based at least in part on the predicted motion profile, a lane change action; wherein controlling the vehicle comprises controlling the vehicle to perform the lane change action, and wherein the object is located in a target lane of the lane change action.

L: The method of paragraph F, further comprising: determining that the yield score is below a yield score threshold; wherein controlling the vehicle comprises controlling, based at least in part on the yield score being below the yield score threshold, the vehicle to refrain from performing a lane change action.

M: The method of paragraph F, wherein the machine-learned model is trained based at least in part on training attribute data and ground truth attribute data indicative of a success of a lane change.

N: A non-transitory computer-readable medium storing instructions executable by a processor, wherein the instructions, when executed, cause the processor to perform operations comprising: receiving, from a sensor of a vehicle, sensor data of an environment; determining, based at least in part on the sensor data, a presence of an object in the environment; determining, based at least in part on the sensor data, attribute data; inputting the attribute data into a machine-learned model; receiving, from the machine-learned model, a yield score indicating a probability of a yield action associated with the object; and controlling, based at least in part on the yield score, the vehicle to traverse the environment.

O: The non-transitory computer-readable medium of paragraph N, wherein the sensor data comprises simulated sensor data, the environment is a simulated environment, and the vehicle is a simulated vehicle.

P: The non-transitory computer-readable medium of paragraph N, wherein, and the operations further comprising: determining second attribute data associated with a second time; and inputting the second attribute data into the machine-learned model.

Q: The non-transitory computer-readable medium of paragraph P, the operations further comprising: controlling the vehicle to perform a lane change indication that comprises at least one of: enabling a turn indicator, reducing a velocity of the vehicle, increasing the velocity of the vehicle, or controlling the vehicle to reduce a distance between the vehicle and a target lane.

R: The non-transitory computer-readable medium of paragraph N, the operations further comprising: determining that the yield score meets or exceeds a yield score threshold; and determining, based at least in part on determining that the yield score meets or exceeds the yield score threshold, a lane change action; wherein controlling the vehicle comprises controlling the vehicle to perform the lane change action.

S: The non-transitory computer-readable medium of paragraph N, wherein the machine-learned model is trained based at least in part on ground truth data, and wherein the ground truth data comprise ground truth attribute data and data associated with the ground truth attribute data indicative of a success of a lane change.

T: The non-transitory computer-readable medium of paragraph N, the operations further comprising: determining, based at least in part on the yield score, a predicted motion profile indicative of a predicted motion of the object; wherein controlling the vehicle is further based at least in part on the predicted motion profile.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing computer-executable instructions that, when executed, cause the system to perform operations comprising:
receiving, from a sensor of an autonomous vehicle, sensor data representing at least a portion of an environment;
determining a lane change action for the autonomous vehicle to perform in the environment;
determining that an object represented in the sensor data is associated with a target lane associated with the lane change action;
determining, based at least in part on the sensor data, attribute data comprising:
first velocity data associated with the autonomous vehicle,
second velocity data associated with the object, and
a distance between the autonomous vehicle and the object;
inputting the attribute data into a machine-learned model;
receiving, from the machine-learned model, a yield score indicating a probability that the object is yielding to the autonomous vehicle;
determining, as a predicted trajectory, a motion profile based at least in part on comparing the yield score and a candidate yield score associated with a candidate motion; and
controlling, based at least in part on the predicted trajectory, the autonomous vehicle to perform the lane change action.

2. The system of claim 1, wherein the attribute data is first attribute data associated with a first time and the distance is a first distance, the operations further comprising:
determining second attribute data associated with a second time, the second attribute data comprising:

third velocity data associated with the autonomous vehicle,
fourth velocity data associated with the object, and
a second distance between the autonomous vehicle and the object at the second time; and
inputting the second attribute data into the machine-learned model.

3. The system of claim 2, wherein the second attribute data is further based at least in part on a lane change indication.

4. The system of claim 1, the operations further comprising:
determining, based at least in part on the yield score, a cost associated with the lane change action;
wherein controlling the autonomous vehicle is further based at least in part on the cost.

5. The system of claim 1, wherein the object is associated with at least one of:
an additional vehicle;
a bicyclist;
a motorcycle; or
a truck.

6. A method comprising:
receiving, from a sensor of a vehicle, sensor data of an environment;
determining, based at least in part on the sensor data, a presence of an object in the environment;
determining, based at least in part on the sensor data, attribute data comprising:
first velocity data associated with the vehicle;
second velocity data associated with the object; and
a distance between the vehicle and the object;
inputting the attribute data into a machine-learned model; and
receiving, from the machine-learned model, a yield score indicative of a probability of a yield action associated with the object;
determining, as a predicted trajectory, a motion profile based at least in part on comparing the yield score and a candidate yield score associated with a candidate motion; and
controlling, based at least in part on the predicted trajectory, the vehicle.

7. The method of claim 6, wherein the attribute data is first attribute data associated with a first time and the distance is a first distance, the method further comprising:
determining second attribute data associated with a second time, the second attribute data comprising:
third velocity data associated with the vehicle;
fourth velocity data associated with the object; and
a second distance between the vehicle and the object; and
inputting the second attribute data into the machine-learned model.

8. The method of claim 7, further comprising:
controlling the vehicle to perform a lane change indication;
wherein determining the attribute data is further based at least in part on the lane change indication.

9. The method of claim 8, further comprising:
determining that the yield score meets or exceeds a yield score threshold;
wherein controlling the vehicle is further based at least in part on the yield score meeting or exceeding the yield score threshold.

10. The method of claim 6, further comprising:
determining, based at least in part on the yield score, a predicted motion profile indicative of a predicted motion of the object;
wherein controlling the vehicle is further based at least in part on the predicted motion profile.

11. The method of claim 10, further comprising:
determining, based at least in part on the predicted motion profile, a lane change action;
wherein controlling the vehicle comprises controlling the vehicle to perform the lane change action, and
wherein the object is located in a target lane of the lane change action.

12. The method of claim 6, further comprising:
determining that the yield score is below a yield score threshold;
wherein controlling the vehicle comprises controlling, based at least in part on the yield score being below the yield score threshold, the vehicle to refrain from performing a lane change action.

13. The method of claim 6, wherein the machine-learned model is trained based at least in part on training attribute data and ground truth attribute data indicative of a success of a lane change.

14. The method of claim 6, wherein:
the object is at least one of:
an additional vehicle;
a bicyclist;
a motorcycle; or
a truck; and
the object is associated with a drivable area in the environment.

15. A non-transitory computer-readable medium storing instructions executable by a processor, wherein the instructions, when executed, cause the processor to perform operations comprising:
receiving, from a sensor of a vehicle, sensor data of an environment;
determining, based at least in part on the sensor data, a presence of an object in the environment;
determining, based at least in part on the sensor data, attribute data;
inputting the attribute data into a machine-learned model;
receiving, from the machine-learned model, a yield score indicating a probability of a yield action associated with the object;
determining, as a predicted trajectory, a motion profile based at least in part on comparing the yield score and a candidate yield score associated with a candidate motion; and
controlling, based at least in part on the predicted trajectory, the vehicle to traverse the environment.

16. The non-transitory computer-readable medium of claim 15, wherein the sensor data comprises simulated sensor data, the environment is a simulated environment, and the vehicle is a simulated vehicle.

17. The non-transitory computer-readable medium of claim 15, wherein, and the operations further comprising:
determining second attribute data associated with a second time; and
inputting the second attribute data into the machine-learned model.

18. The non-transitory computer-readable medium of claim 17, the operations further comprising:
controlling the vehicle to perform a lane change indication that comprises at least one of:
enabling a turn indicator,
reducing a velocity of the vehicle,
increasing the velocity of the vehicle, or
controlling the vehicle to reduce a distance between the vehicle and a target lane.

19. The non-transitory computer-readable medium of claim 15, the operations further comprising:
determining that the yield score meets or exceeds a yield score threshold; and
determining, based at least in part on determining that the yield score meets or exceeds the yield score threshold, a lane change action;
wherein controlling the vehicle comprises controlling the vehicle to perform the lane change action.

20. The non-transitory computer-readable medium of claim 15, the operations further comprising:
determining, based at least in part on the yield score, a predicted motion profile indicative of a predicted motion of the object;
wherein controlling the vehicle is further based at least in part on the predicted motion profile.

\* \* \* \* \*